United States Patent
Chodos et al.

[19]
[11] Patent Number: 5,872,857
[45] Date of Patent: Feb. 16, 1999

[54] GENERALIZED BIASED CENTROID EDGE LOCATOR

[75] Inventors: Steven L. Chodos, Los Angeles; Stacy Roszkowski, Santa Monica, both of Calif.

[73] Assignee: Raytheon Company, El Segundo, Calif.

[21] Appl. No.: 651,470

[22] Filed: May 22, 1996

[51] Int. Cl.⁶ .................................... G06T 7/60
[52] U.S. Cl. .................. 382/103; 382/199; 382/288; 348/171
[58] Field of Search ................... 382/103, 199, 382/107, 288; 348/169, 170, 171, 172; 235/411; 342/95; 244/3.16

[56] References Cited

U.S. PATENT DOCUMENTS

| | | | |
|---|---|---|---|
| 3,950,611 | 4/1976 | Callis et al. | 348/171 |
| 4,133,004 | 1/1979 | Fitts | 348/169 |
| 4,189,747 | 2/1980 | Funari | 348/170 |
| 4,539,590 | 9/1985 | Gage | 348/172 |
| 4,549,211 | 10/1985 | Assael et al. | 348/171 |
| 4,849,906 | 7/1989 | Chodos et al. | 348/171 |

FOREIGN PATENT DOCUMENTS

| | | | |
|---|---|---|---|
| 687 922 A2 | 6/1995 | European Pat. Off. | G01S 3/786 |
| 2 204 681 | 11/1988 | United Kingdom | G01N 15/04 |

*Primary Examiner*—Jon Chang
*Attorney, Agent, or Firm*—Colin M. Raufer; Leonard A. Alkov; Glenn H. Lenzen, Jr.

[57] ABSTRACT

An edge locator processor having memory and which employs a generalized biased centroid edge locator process to determining the leading edge of an object in a scene moving in a generally horizontal direction across a video screen. The generalized biased centroid edge locator process includes defining a gate and determining the centroid position for that portion of the object within the gate. This occurs for a succession of gates, until predetermined conditions are met. By constructing this series of successively expanding gates, a left gate edge position and centroid position may be determined for each gate to define a series of left edge and centroid positions. These values may be linearly correlated to provide a slope and an intercept, from which the edge may be determined.

17 Claims, 4 Drawing Sheets

GENERALIZED BIASED CENTROID EDGE LOCATOR

BACKGROUND OF THE INVENTION

The present invention broadly relates to video trackers for tactical system applications, and more particularly, relates to a tracker which quickly resolves the position of the leading edge or trailing of an object using only a single video frame of data.

Centroid and correlation type video tracking processors are well known in the art. For example, U.S. Pat. No. 4,133,044 issued Jan. 2, 1979 to Fitts, assigned to the Assignee of the present invention, and incorporated by reference herein, discloses a video correlation tracker which employs a recursive reference to calculate tracking error computations. The correlation tracker disclosed in the Fitts patent includes a circuit for generating a reference map in pixel format. Reference map pixel information derived from previous video frames is stored in a recursive memory to allow the calculation of azimuth and elevation optimal weighing values for each pixel in the field of view. The difference between the intensity value for each video pixel being received during the current frame and the intensity value of the corresponding reference map pixel is multiplied by an appropriate weighing function. Each resultant product is then combined in an accumulator to form azimuth and elevation correlation over the designated track gate area which can be as large as the entire field of view (FOV), less a one pixel border. The weighing factors for each pixel are also combined and accumulatively added over the entire image plane to form three adaptive scale factors at the end of each frame which are combined with the azimuth and elevation correction error signals to eliminate cross coupling and generate cross-coupling-free correlation error signals. The correlator tracks relative to a reference, but does not explicitly locate an edge feature.

In one particular, earlier application of a tracking system which was required to locate the leading edge or nose of a target drone for a point reference, the tracking system included several Fitts correlations and centroid tracking gates, but did not include edge trackers or image processing capabilities. The mode control required that the operator manually place a track gate cursor on the nose of the target drone and transition into partial body track on the nose using the Fitts correlation and centroid track gates. During this time, the target drone was held in track using full body correlation track in another gate. While this system functioned quite well during ground tests, using this system in airborne tests proved difficult for the operator.

This difficulty resulted in the development of a biased centroid processor. The biased centroid processor uses a tall, narrow (with respect to the image frame) centroid gate having a predetermined bias which was added to the centroid output in the direction of flight projected onto the field of view (FOV). For example, if G represents the gate width, the azimuth bias for conical nose is approximately G/3. The biased centroid processor requires a pitch correction so that the drone progresses horizontally across the field of view.

In the biased centroid processor, by placing the gate anywhere on the target body, the gate races in the direction of the bias until it reaches the edge of the target. When the edge of the target is reached, the gate stops with the target edge approximately centered in the gate and holds this position.

While the biased centroid processor provides satisfactory operation, the error function for this process is non-linear, resulting at times in less than optimum operation of the processor. For example, if the gate is placed so that the edge of the target falls outside the gate, the output, which is the position of the bias added to the position of the centroid, equals the bias. Further, if the gate falls off of the edge of the target, the gate continues to move in that direction and provides no output. Further yet if the bias is too small, a metastable equilibrium state results in which the gate moves in response to noise, but does not locate the edge. Even in the ideal situation where the edge falls within the gate, the output (the bias added to the centroid) equals one half the distance of the centroid plus the bias. That is, the output equals the error with a gain of one-half for a rectangular target. If bias is too large, the gate will not stop at the edge, and the track will be lost. However, a gain of one-half requires more than one frame of data to locate the edge.

Additional particular disadvantages exist using the biased centroid. First, the biased centroid processor requires that the operator select the correct bias in accordance with the predicted shape of the object to be tracked. If the wrong bias is selected, the biased centroid processor may not provide an edge at the center of the gate. Second, the biased centroid processor provides only the location of the edge of the gate at equilibrium, rather than an absolute edge position within the field of view. Finally, in the biased centroid processor, the gates are moved for every frame. Thus, the biased processor requires several frames in order to yield an estimate of the absolute edge position of an object which may not be sufficient in order to meet certain processing requirements.

Though the biased centroid algorithm does suffer from some minor disadvantages, the algorithm has several desirable features as well. First, the processor allows for partial body tracking (correlation algorithms also allow for partial body tracking, but do not give edge locations explicitly). Further, the biased centroid processor is less sensitive to noise than other edge detection processors because the biased centroid processor uses more pixels in determining the position of the centroid than other edge detection processors. These advantages provide good reasons for further improving the biased centroid approach to edge detection.

Thus, it is an object of the present invention to provide a generalized biased edge detection processor which can do partial body tracking and provide the absolute biased centroid position within one image frame, thereby minimizing the processing time.

SUMMARY OF THE INVENTION

According to the present invention, an apparatus is provided for locating a leading edge of an object defined within a video frame of data in accordance with the intensity of pixels, which are arranged generally vertically and horizontally. The apparatus includes memory for storing the intensity of the pixels of the video frame. The apparatus further includes a processor for retrieving the intensity of the pixels from the memory and for determining the leading edge of the object within the video frame.

The processor performs several the steps, including defining a gate having a predetermined width within the video frame. The processor determines a centroid of the portion of the object within the gate and tests if the centroid falls within a preselected section of the gate. The processor repositions the gate if the centroid does not fall within the preselected section of the gate, and redetermines the centroid for the portion of the object appearing within the repositioned gate. Lastly, the processor determines the leading edge of the object in accordance with the position of the gate and the position of the centroid and outputs the position of the leading edge of the object for use in tracking the object.

The various advantages of the present invention will become apparent to one skilled in the art by reading the following specification and by reference to the following drawing in which:

BRIEF DESCRIPTION OF THE DRAWINGS

In the drawings, which form an integral part of the specification and are to be read in conjunction therewith and in which like referenced numerals are employed to designate identical components in the various views.

DETAILED DESCRIPTION OF A PREFERRED EMBODIMENT

Figure 1:
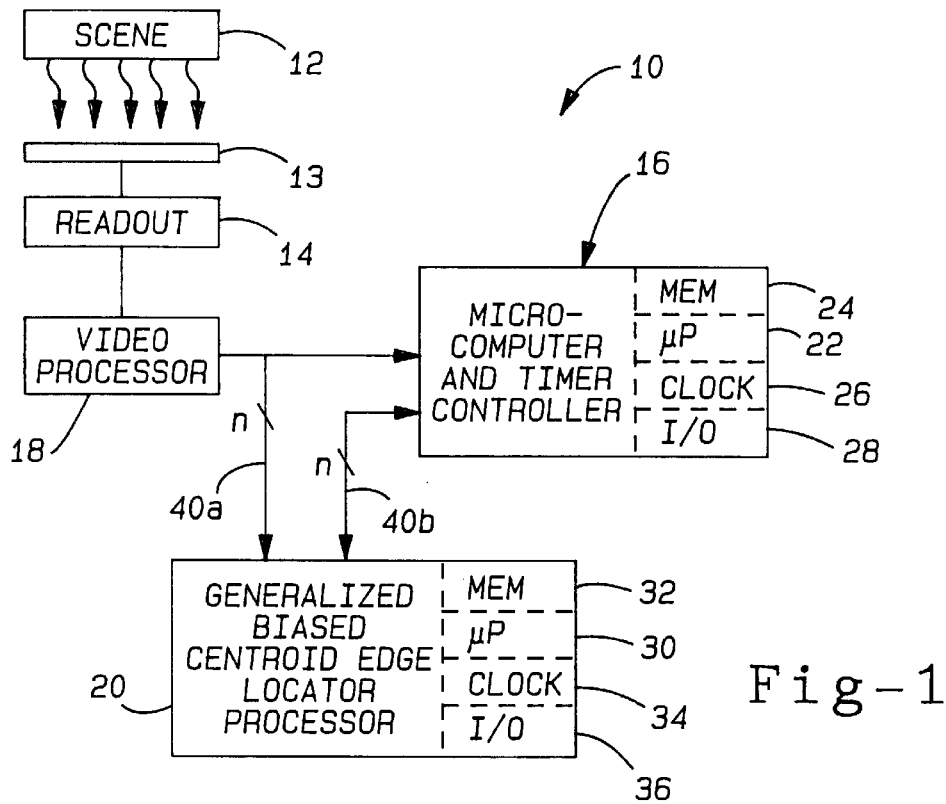
FIG. 1 provides a block diagram of the generalized biased centroid edge locator system arranged in accordance with the principles of the present invention.

Referring first to FIG. 1, the present invention provides a tracking and edge detection system 10 for following and tracking an object within a target scene 12 which is sensed by a detecting array 13 and readout 14. Target scene 12 typically includes an object to be tracked by the tracking and edge detection system 10 (hereinafter, "edge detection system"). The readout 14 receives input signals from any of a number of various types of detecting arrays 13, as will be known to one skilled in the art, for receiving radiated electromagnetic energy from the scene 12. The detecting array 13 may include associated optics as well. The received electromagnetic energy enables recording the scene 12 in a form which may be converted to video signals by the readout 14. The readout 14 converts the recorded electromagnetic energy into analog or digital video signals and provides these video signals along with the appropriate video synchronization signals to video preprocessor 18.

The edge detection system 10 broadly also includes a microcomputer and time controller 16 (hereinafter, "microcomputer"), a video preprocessor 18, and a generalized biased centroid edge locator processor 20 (hereinafter, "edge locator processor"). The microcomputer 16, video preprocessor 18, and edge locator processor 20 are typically interconnected by common data bus and other control lines which enable the interchange of control and data signals between these components.

The microcomputer 16 may include a microprocessor 22, which may be, by way of example, a Mercury i860 microprocessor. Microcomputer 16 also typically includes a memory 24, either random access memory (RAM) and/or read only memory (ROM), for storing data used by the microprocessor 22 and other components. A clock 26 provides timing signals to enable synchronization between the individual components within microcomputer 16 as well as the video preprocessor 18 and edge locator processor 20. An input/output controller (I/O) 28 manages the input and output to microcomputer 16.

Similarly, edge locator processor 20 may include a microprocessor 30, which may be, by way of example, a Mercury i860 microprocessor. Edge locator processor 20 may also include a memory 32, including a RAM and/or a ROM. A clock 34 provides a timing signal to synchronize operation of the elements of edge locator processor 20 and, optionally, to synchronize operation of the components of the edge detection system 10. Finally, an input/output (I/O) controller 36 manages input and output of data and information signals within and external to the edge locator processor 20.

Data interchange between the video preprocessor 18, the microcomputer 16, and edge locator processor 20 occurs on one or a plurality of data buses 40a and 40b which may include single or multiple lines depending on the data interchange format. As will be understood by one skilled in the art the individual components, such as the microcomputer 16, the video preprocessor 18, or the edge locator processor 20, may be arranged in a first embodiment as shown in FIG. 1. One skilled in the art will also recognize that the individual components may be arranged in various combinations to comprise a centralized processor or, in the alternative, the individual components may be further subdivided for more distributed processing modes of operation.

In operation, the readout 14 of FIG. 1 detects the scene 12 through the detecting array 13. The video preprocessor 18 receives an output signal from the readout 14 and generates frames of data output to microcomputer 16 and edge locator processor 20. Each frame of data represents one snapshot of scene 12, and the video preprocessor 18 rapidly outputs snapshots of the scene 12 in a predetermined (synchronous or asynchronous fashion) for output to microcomputer 16 and edge locator processor 20.

Figure 2A:
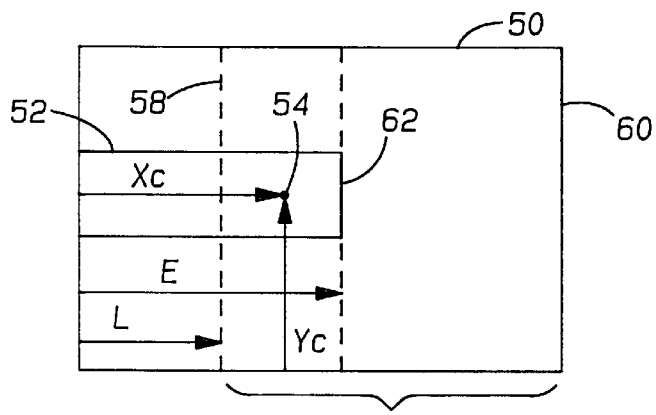
FIGS. 2a and 2b depict the resultant end conditions when the generalized biased centroid processor operates on rectangular and triangular, respectively, shaped objects in the field of view.
Figure 2B:
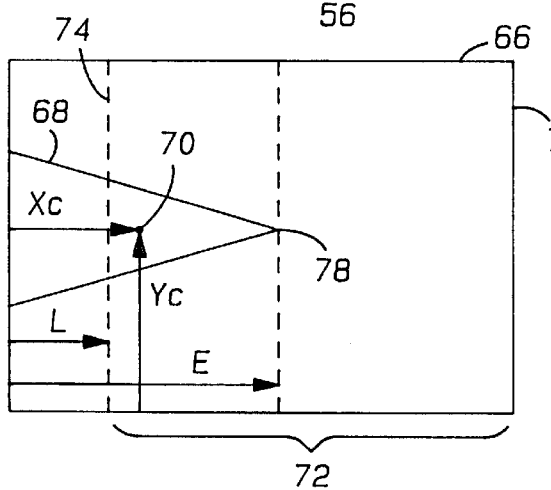

Within each frame of data output by video preprocessor 18, an object may appear, and the components of the edge detection system 10 operate to determine the leading edge of the object found in each individual frame. For example, FIGS. 2a and 2b depict a frame of data as may be typically output by video preprocessor 18. In FIG. 2a, the frame 50 shows a generally rectangular object 52 having a centroid 54. The position of centroid 54 is defined by a horizontal position Xc measured with respect to the left edge of the frame or field of view (FOV) 50 and a vertical position Yc measured from the top edge of the frame or FOV 50. Also shown in FIG. 2a is a gate 56 defined by a left edge 58 whose position L is measured from the left edge of the frame or FOV 50. Gate 56 also includes a right edge 60 which generally coincides with the right edge of the frame or FOV 50. The edge 62 of the rectangular object 52 is a horizontal position E measured with respect to the left edge of the frame or FOV 50.

Similarly, FIG. 2b depicts an exemplary frame 66 which also may be typically output by video preprocessor 18. Frame 66 shows a triangular shaped object 68 having a centroid 70 whose horizontal position Xc is measured from the left edge of the frame or FOV 66 and whose vertical position Yc is measured from the bottom edge of the frame or FOV 66. The frame or FOV 66 of FIG. 2b also includes a gate 72 having a left edge 74 whose position L is measured from the left edge of the frame or FOV 66. The right edge 76 of gate 72 typically coinciding with the right edge of the frame or FOV 66. The triangular object 68 also has a leading edge 78 whose position E is measured with respect to the left edge of the frame or FOV 66.

The objects 52 and 68 shown in frames 50 and 66, respectively, generally move in a horizontal direction from the left edge towards the right edge of their respective frames 50 and 66. Alternatively, objects 52 and 68 may move generally horizontally from the right edge towards the left edge of their respective frames 50 and 66. It will be noted by those skilled in the art that in order to obtain such a horizontal procession of the objects 52 and 68 across their respective frames 50 and 66, the video preprocessor 18 typically transforms the scene 12 recorded by readout 14 so that the objects 52 and 68 process in a generally horizontal direction. That is, the video preprocessor 18 typically corrects for any pitch of the image so that the image appears to move horizontally across the frames 50 and 66 and also in a plane parallel to the frames 50 and 66, regardless of the actual direction of travel. That is, the video preprocessor 18 corrects for any pitch and for movement of the objects in the target scene 12. This transformation may also be accomplished optically using an optical element such as a K prism.

The present invention determines the leading edge E for the objects 52 and 68, as the case may be, using only one frame of data output by video preprocessor 18 of FIG. 1. The following analytical explanation provides the basis for doing so. With reference to FIGS. 2a and 2b, it can be shown that the centroid location Xc of the frames 50 and 66 can be defined by the equation as follows:

$$Xc - L = \frac{E - L}{n} \quad (1)$$

Where Xc, L, and E are as defined with respect to FIGS. 2a and 2b, and n is 2 for the rectangular shaped object 52 and 3 for the triangular shaped object 68.

This equation can be rewritten as:

$$Xc = \frac{E}{n} + \left(1 - \frac{1}{n}\right)L \quad (2)$$

Equation (2) implies that the centroid Xc lies on a straight line with a slope m, and intercept Xo as defined below:

$$m = \left(1 - \frac{1}{n}\right) \quad (3)$$

$$Xo = \frac{E}{n} \quad (4)$$

It can be shown that the property depicted in equations (2) and (3) applies for all convex shaped images and that the value of n typically lies between 2 and 3. Normally the value of n is approximately 2.5 which corresponds to a parabolic image. Further, for non-convexed shaped objects, the value of n will lie outside this range and may indicate an image break-up condition. It should be noted that n is the correct scale factor for relating changes in the centroid position to changes in the target position.

The linear property described with respect to equations (1) through (4) enables edge location independent of the bias (as described in the background of this specification with respect to prior art centroid edge location) and without advanced knowledge of the target object shape. In addition, by moving the left edge L from right to left across the respective frames or FOVs 50 and 66, a horizontal position Xc of the centroid may be determined for each position L of the left gate edge. This enables the determination of the horizontal position E of the edge of the object for each position L of the left edge.

Figure 3:
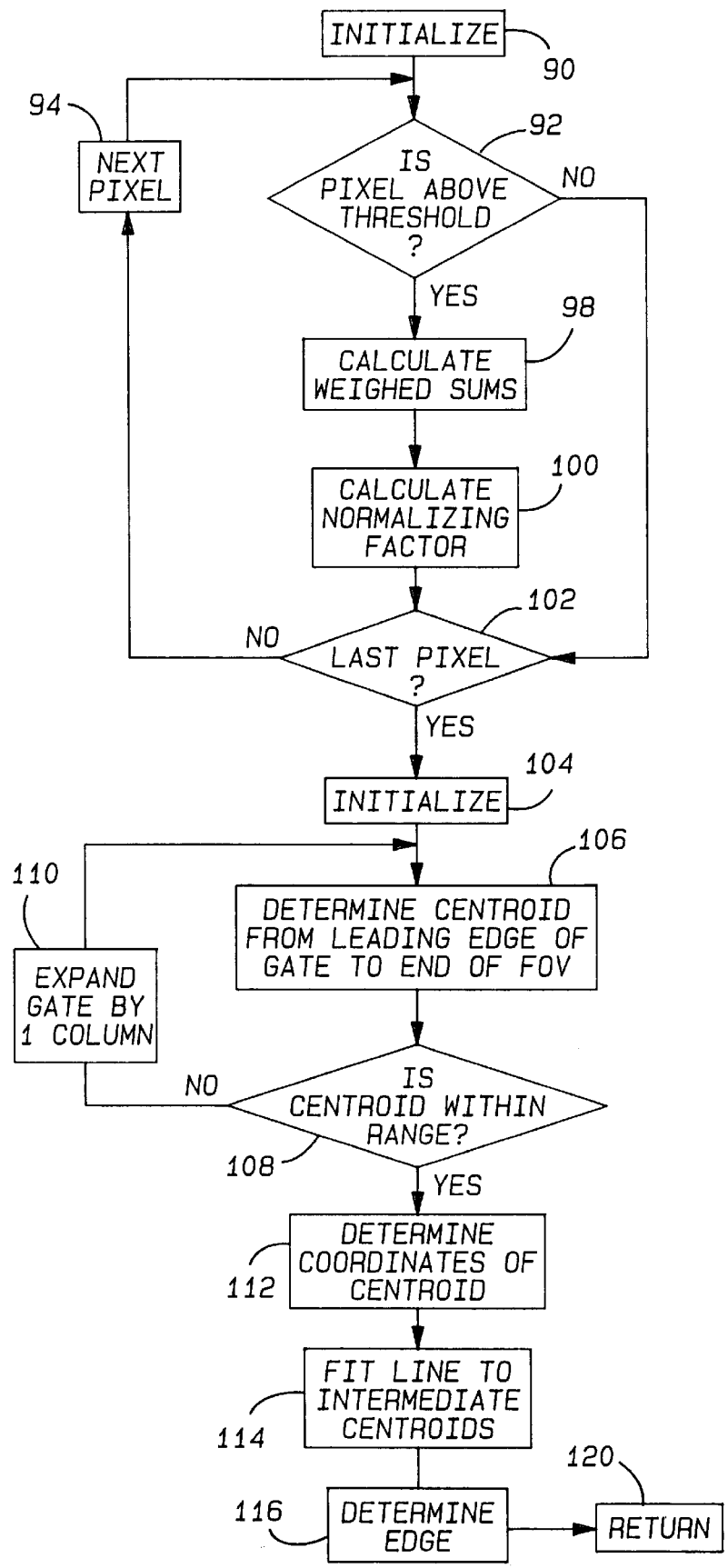
FIG. 3 is a flow diagram of the operation of the generalized bias centroid processor.
Figure 4:
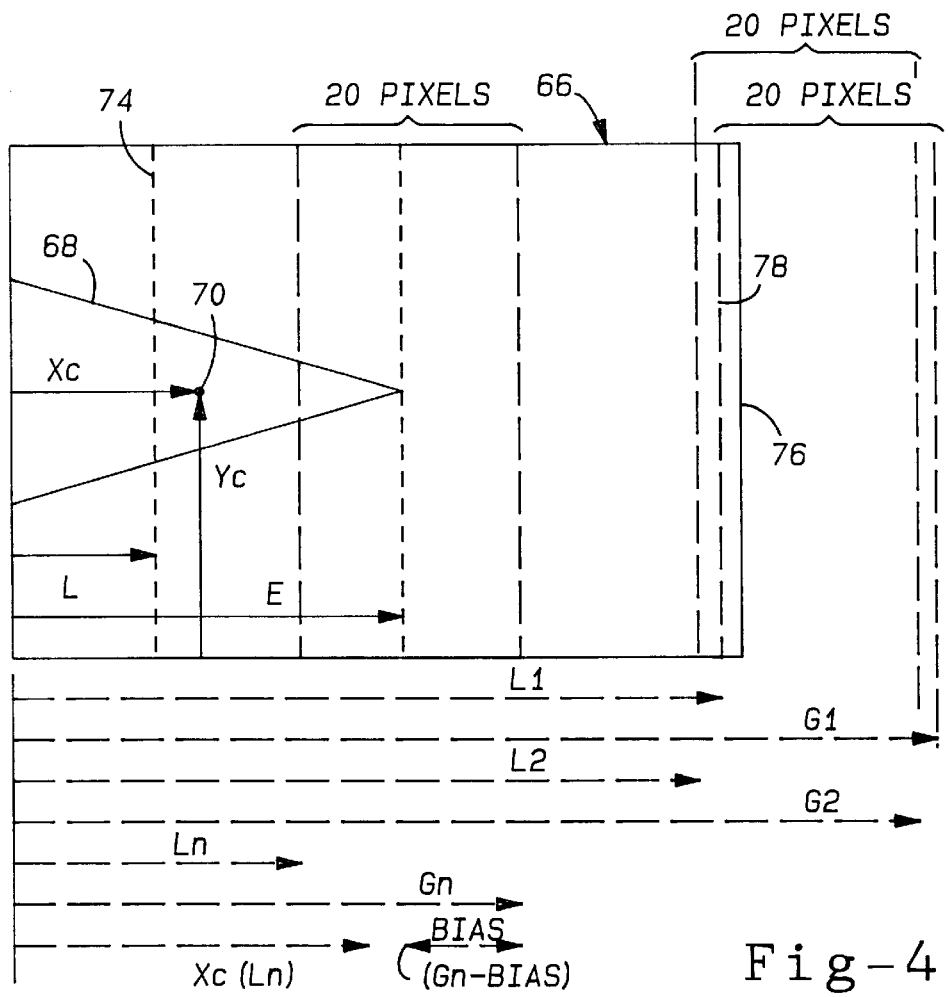
FIG. 4 is an intermediate view of the field of view for assisting in detailing the operation of the generalized biased centroid processor.

Referring to FIGS. 3 and 4, operation of the edge locator processor 20 will be described. FIG. 3 is similar to FIG. 2b, but has been redrawn with additional information to demonstrate individual steps executed during operation of the edge locator processor 20. One skilled in the art will recognize that the same operation described herein may apply to FIG. 2a. The edge locator processor 20 scans from the right edge 76 of the FOV 66 leftward towards the object 68, assuming that the object is moving horizontally from the left to the right. It will be understood by one skilled in the art that if the object is moving horizontally from right to left, scanning of the FOV 66 would begin at the left edge of the FOV 66. During the scanning process, each column of FOV 66 is scanned on a pixel by pixel basis (or other appropriate base element). For each pixel, the edge locator processor 20 determines any portion of the object occupies the scanned column. This is determined in accordance with the intensity of each pixel. For example, assuming a binary intensity arrangement pixels having an intensity of one indicate the object 68 and pixels having an intensity of zero indicate absence of the object.

The edge locator processor 20 determines the position of each pixel that the object 68 occupies and determines the position of the centroid 70 of the object for that portion of the object appearing between the left gate edge 74 and the right edge of FOV 76. The position of the centroid 70 is determined using a weighted sum process as is known to those skilled in the art.

Assume for this explanation that a gate is forty pixels wide and that the center of the gate G=(L+20), where 20 is one-half the width of the gate or 0.5×(40 pixels). A biased centroid typically reaches equilibrium when the position of the centroid in the gate as measured from the center G equals the negative of the bias, i.e., Xc−G=−(BIAS). Typically the bias is equal to the width of the gate divided by three, or approximately thirteen pixels, as in this example where the gate width is 40 pixels. However, the bias may be varied in order to vary the size of the image contributing to the determination of the centroid 70, and thus the edge of the object.

For example, in FIG. 4, the position L of the gate starts at the left edge. L1 defines the left edge of the first gate and G1 defines the left edge L1 of the gate plus 20 pixels. Note that the selection of 20 pixels is by way of example. Typically, the value is a constant selected in accordance with the gate size and the expected target. The position Xc of the centroid for the object 68 within the first gate is determined. However, no portion of the object 68 lies within the first gate, so no centroid position can be determined. The left edge of the gate is then moved to L2 to define a second gate, where G2 defines the left edge L2 plus 20 pixels. The position Xc of the centroid is determined for that portion of the object 68 within the second gate. Similarly to the first gate, no portion of the object lies within the second gate, so no centroid position Xc is determined. This process repeats until a centroid position Xc≧(G−BIAS). For example, in FIG. 4, say Ln defines the left edge of the gate and Gn defines L plus 20 pixels. The centroid 80 for the portion of the object 68 within the gate defined by Ln has a horizontal position Xc. Because Xc<(G−BIAS), this process repeats until this condition is satisfied.

The edge locator processor 20 determines a horizontal positions Xc of the centroid for that portion of the object 68 within the gate. By moving the left edge of the gate and determining a new centroid position for that portion of the object within the new gate, a centroid position Xc may be determined in accordance with each position L of the left edge of the gate. The horizontal positions Xc of the centroids and the horizontal positions L of each gate may then be fitted to a straight line by a regression process. The slope M of the line determines the value of n, from which the edge position E may be determined.

FIG. 3 is a flow diagram of the operation of the edge locator processor 20 as described above. At step 90 the processor is initialized. Control then passes to decision step 92 which initiates a process of examining each pixel in the field of view 66 on a column by column basis to determine which pixels the object occupies in the electronic image. In step 92, each pixel is tested to determine if the intensity exceeds a predetermined threshold. Exceeding the threshold indicates that the object 68 (of FIG. 4) occupies that pixel. If the pixel intensity does not above a predetermined threshold, control passes to step 96 where a test is performed to determine if the last pixel has been examined. If the last pixel has been examined, control then passes onto the next step, to be described further herein with respect to steps 104 to 120. If the last pixel has not been examined, the next pixel for examination is selected at step 94.

Returning to step 92, if the pixel exceeds a predetermined threshold, the weighted sums are determined for each particular pixel in anticipation of locating the centroid 70 of the object 68 (of FIG. 4). At steps 98, the edge locator processor 20 determines the weighted sums for pixels exceeding the threshold value in accordance with equations (5) through (6) below. At step 100 the edge locator processor 20 determines a normalization factor in accordance with equation (7) below:

$$x(j) = j * \sum_{i=0}^{MAXi} Ith(i,j) \tag{5}$$

$$y(j) = \sum_{i=0}^{MAXi} Ith(i,j) * i \tag{6}$$

$$I(j) = \sum_{i=0}^{MAXi} Ith(i,j) \tag{7}$$

Where Ith(i,j) is a matrix storing the intensity of pixel (i,j) above the threshold;

x(j) is a weighted sum of the $j^{th}$ column for locating the horizontal position Xc of the centroid 70;

y(j) is the weighted sum of the $j^{th}$ column for determining the vertical position Yc of the centroid 70; and I(j) is a normalization value applied to the weighted sums x(j) and y(j).

It should be recognized by one skilled in the art that the above weighted sum determination is equally applicable to either a binary or intensity based representation of the object 68 in the FOV 66. The binary representation of the centroid is as described above. In the intensity-based representation of the object 68, the intensity of each pixel (i,j) not only indicates whether the object 68 occupies that pixel but also indicates the intensity of the electromagnetic radiation reflected by a particular section of the object.

Following determining the weighted sums and the normalization value, control then passes to decision block 102 where the edge locator processor 20 performs a test to determine if all pixels in the FOV 66 have been examined. If not, control passes to step 94 where the next pixel for inspection is selected. If all pixels have been inspected and the partial sums determined, control then passes to step 104 in which the edge locator processor 20 initializes several parameters in preparation for determining the edge position E.

At step 104 initialization occurs. During initialization various values are preset. For example, the gate size is predetermined to be 40, and the center of the gate G is predetermined to be 20 pixels from the left edge position L, i.e., G=L+20. Further, the bias is predetermined to be the gate width divided by three or approximately thirteen pixels in this particular example. After initializing the parameters for the locating the edge position E of the object 68 (as shown in FIG. 4), control proceeds to step 106 to determine the horizontal position Xc of that portion of the object 68 between the left gate edge, L1, L2, . . . , Ln and the right edge 76 of the FOV 66. Following the determination of the horizontal position Xc of the centroid 70, a test is performed to determine if the centroid is within a predetermined range, defined by Xc≧(G−BIAS), where G=L+20. If the centroid 70 is not within this range, the gate is then expanded by one pixel width as shown at step 110.

FIG. 4 demonstrates the operation of steps 106, 108, and 110 in diagrammatic form. L1 represents the horizontal position of the first column of pixels 78 at the far right edge of FOV 66. G1 represents one-half the gate width or 20 pixels to the right of L1. If the centroid is not within the range G−BIAS (13 pixels in this example), the gate is expanded by one column, as shown at step 110, so that the left edge of the gate becomes L2 and 20 pixels to the right of the left edge becomes G2. During this process, the partial sums for that portion of the centroid within the gate is computed in accordance with the following equations for L=L$_1$ . . . L$_n$:

$$Ip(L) = \sum_{j=MAXj}^{L} I(j) \tag{8}$$

$$Xp(L) = \sum_{j=MAXj}^{L} X(j) \tag{9}$$

$$Yp(L) = \sum_{J=MAXj}^{L} Y(j) \tag{10}$$

$$Xc(L) = \frac{Xp(L)}{Ip(L)} \tag{11}$$

Where Ip(L) is the normalization value for the portion of object 68 within the gate;

Xp(L) and Yp(L) are the vertical and horizontal partial sums for the portion of the object within the gate with left edge at L, respectively; and Xc (L) is the horizontal position of the centroid for that portion of the object 68 within the gate with left edge L.

The process defined by steps 106, 108, and 110 terminates when the horizontal position of the centroid Xc is to the right of (G−BIAS). FIG. 4 depicts this situation graphically. Referring to the gate defined by left edge Ln, when the horizontal position of centroid Xc(Ln) is to the right of (G−BIAS), the centroid is determined to be within range. With respect to FIG. 4, the horizontal position of the centroid Xc(Ln) is to the left of (G−BIAS), therefore the centroid is not yet within range. Once the centroid is within range, control proceeds to step 112 which determines the coordinates of the centroid in accordance with the following equation:

$$Yc = \frac{Yp(Ln)}{Ip(Ln)} \tag{12}$$

Where Yc is the vertical position of the centroid 70 within the gate.

Following determination of the position of the centroid 70, the edge locator processor 20 performs a regression analysis to fit a line to the left gate edge positions L1, L2, . . . , Ln and the horizontal positions Xc of the centroids for that portion of the object within the gates defined by L1, L2, ..., Ln, as shown at step 114. The linear regression returns a slope m and an intercept Xo. The edge locator processor 20 then determines the edge E of the object 68 using the equations (2) and (3) described above in accordance with the slope and intercept returned by step 114. It should be noted that a weighted least squares determination can be made with weights determined to reduce the noise.

Figure 5:
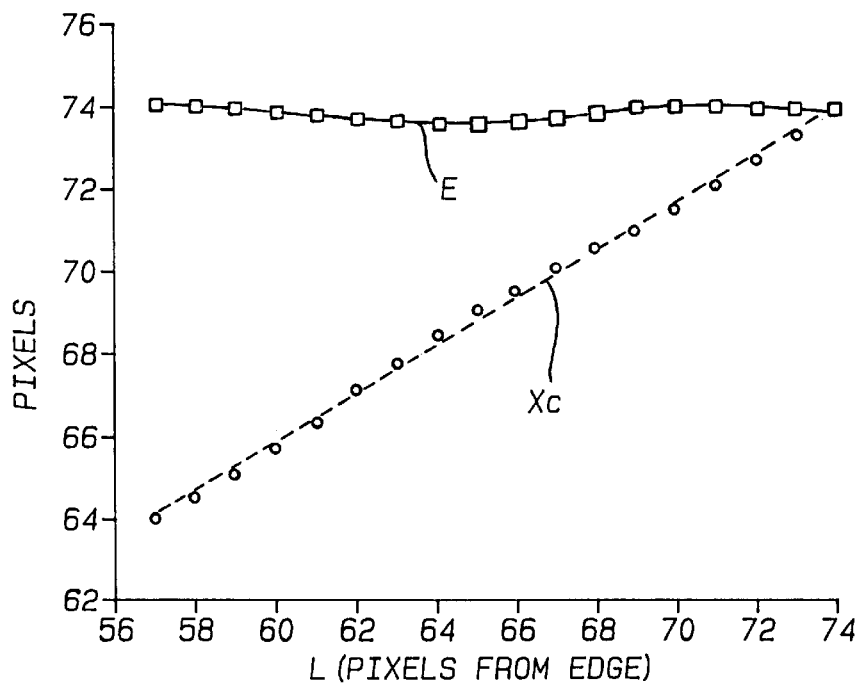
FIG. 5 is a graph of the centroid location and the edge position as a function of the left edge position of the gate.

FIG. 5 is a graph of the horizontal position Xc of the centroid versus the horizontal position of the L left edge 74 of the gate for an exemplary object. The horizontal position L of the gate is defined in pixels along the horizontal axis and the horizontal position Xc of the centroid 70 is plotted in pixels along the vertical axis. Step 114 determines the best fit line Xc for the circular points plotted on the graph of FIG. 5. The line Xc has a slope m and an intercept Xo which is used to determine n of equation (2), which then may be used to determine E of equation (3), as shown at step 116. In FIG. 5, the line E depicts the intermediate values of E for the gates defined by left edges at L1, L2, ..., Ln. Note that E typically is not determined until the centroid 70 falls to the right of (G–BIAS). In such a situation, E may then be determined following the determination of the slope and intercept of the line Xc. After having determined the edge E, the edge locator processor outputs the value of E as shown at step 120.

Figure 6:
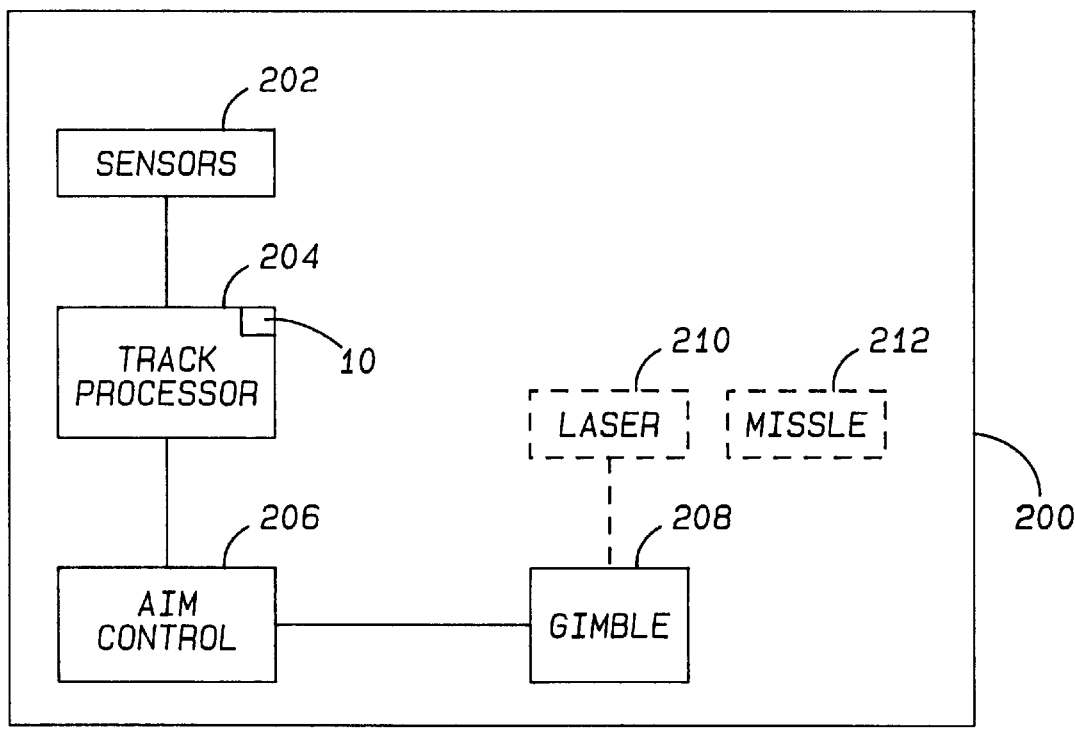
FIG. 6 is a block diagram of an exemplary missile defeat system in which the present invention may be implemented.

FIG. 6 depicts a block diagram of an airborne missile defeat system 200 in which the present invention may be implemented to improve the edge detection and tracking capability of the missile defeat system 200. The system includes sensors 202 which monitor the environment to initially detect an airborne object such as a missile. The sensors provide an input to a track processor 204 which processes images of the scenes detected by sensors 202 and determines if an object to be tracked exists therein. Track processor 204 includes a tracking and edge detection system 10 described with respect to FIGS. 1–5. Track processor advantageously uses the tracking and edge detection system 10 to detect the leading or trailing edge of the object within the image. Track processor 204 in turn generates output signals detailing the pertinent information regarding tracking of the object detected within the scene. These signals are input to aim control block 206 which receives the detection and tracking information. Aim control block 206 generates control signals for operably controlling a gimble 208 on which may be mounted any of a number of devices which require aiming for the missile defeat system 200 to operate properly. In this particular example, a laser 210 is mounted to the gimble 208. Laser 210 outputs a laser beam which operates to disable the missile. In an alternative system, laser 210 may output a laser beam to track the object and provide an aim point for a missile 212 programmed to track the object illuminated by laser 210.

From the foregoing, it can be seen that the absolute horizontal and vertical position of the centroid may be determined within the field of view of each frame, using only a single frame of data, rather than multiple frames to determine the absolute position of the edge E. Further, because the edge locator processor does not depend on the correct selection of a bias, as do previous biased centroid edge detection algorithms, significant error may be eliminated from the edge detection process. Further, in this process the edge detection does not depend on the correct selection of the gate or the correct assumptions regarding the target being tracked.

Although the invention has been described with particular reference to certain preferred embodiments thereof, variations and modifications can be effected within the spirit and scope of the following claims.

What is claimed is:

1. In a tracking system for locating a leading edge of an object within a video frame of data, the video frame having pixels arranged generally vertically and horizontally, and the object is defined within the video frame in accordance with the intensity of the pixels, a processor for examining the intensity of the pixels and for determining the leading edge of the object within the video frame, the processor comprising:
  (a) means for defining a gate having a position within the video frame,
  (b) means for determining a centroid of a portion of the object within the gate, the centroid having a position defined by a line having a slope,
  (c) means for testing if the centroid falls within a preselected section of the gate, and moving an edge of the gate to define a new gate if the centroid does not fall within the preselected section of the gate, and redetermining the centroid for the portion of the object appearing within the new gate, and
  (d) means for determining the leading edge of the object in accordance with the position of the gate, the position of the centroid, and the slope,
  wherein said processor outputs the position of the leading edge of the object for use in tracking and intercepting the object.

2. The invention as defined in claim 1 further comprising a detecting array for detecting the object and for generating an electromagnetic signal for defining the video frame.

3. The invention as defined in claim 2 further comprising an image preprocessor for generating the electromagnetic signal defining the video frame.

4. The invention as defined in claim 1 wherein the processor is a microprocessor.

5. The invention as defined in claim 1 further comprising:
  an image preprocessor for generating an electromagnetic signal defining the video frame; and
  a microprocessor to control data transfer between each of the processor, the preprocessor, and the microprocessor.

6. The invention as defined in claim 1 wherein the processor further performs the step of calculating partial sums and a normalization value in accordance with the intensity of the pixels and in accordance with the position of the pixels.

7. The invention as defined in claim 1 wherein the video frame is defined by a plurality of pixels each having a discreet location (i,j), and I(i,j) defines the intensity of the (i,j) pixel, and the processor generates a horizontal partial sum Xp(L) for gates having edges L=$L_1, L_2, \ldots, L_n$ of the object within the gate for the I(i,j) pixels above a predetermined threshold according to the following relationship $$Xp(L) = \sum_{j=\text{Max}j}^{L} X(j)$$

and the processor generates a vertical partial sum Yp(L) of the object within the gate for the I(i,j) pixels above a predetermined threshold according to the following relationship $$Yp(L) = \sum_{j=\text{Max}j}^{L} Y(J)$$

and the processor generates a normalization value Ip(L) of the object within the gate for the I(i,j) pixels above a predetermined threshold according to the following relationship $$Ip(L) = \sum_{j=\text{Max}j}^{L} I(j)$$

8. The invention as defined in claim 7 wherein the processor generates a horizontal position Xc(L) for gates having edges L=L$_1$ ... L$_n$ of the centroid for the portion of the object appearing within the gate according to the following relationship $$Xc(L) = \frac{Xp(L)}{Ip(L)}$$

9. The invention as defined in claim 8 wherein the gate includes a left edge having a horizontal position L and the centroid of the object has a horizontal position E, and the horizontal position edge E of the centroid Xc is defined in accordance with the following relationship $$Xc = \frac{E}{n} + \left(1 - \frac{1}{n}\right) \times L$$

where $2 \leq n \leq 3$.

10. The invention defined in claim 9 wherein Xc defines a line having an intercept Xo and slope m and the horizontal position E of the edge of the object is defined in accordance with the following relationships $$n = \frac{1}{1-m}, \text{ and}$$

$$E = X_0 \times n.$$

11. A method for locating a leading edge of an object within a video frame of data, the video frame having pixels arranged generally vertically and horizontally, and the object is defined within the video frame in accordance with the intensity of the pixels, the method comprising the steps of:
   defining a gate having a predetermined width and position within the video frame,
   determining a centroid of the object within the gate, the centroid having a position defined by a line having a slope;
   testing if the centroid falls within a preselected section of the gate, and moving an edge of the gate to define a new gate if the centroid does not fall within the preselected section of the gate and redetermining the centroid for the portion of the object appearing within the new gate, where the determining and testing steps are repeated until the centroid falls within the preselected section of the gate; and
   determining the leading edge of the object in accordance with the position of the gate, the position of the centroid, and the slope.

12. The method as defined in claim 11 further comprising the step of calculating for each gate partial sums and a normalization value in accordance with the intensity and position of the pixels.

13. The method as defined in claim 12 wherein the video frame is defined by a plurality of pixels each having a discreet location (i,j), and I(i,j) defines the intensity of the (i,j) pixel, and the step of generating partial sums and a normalization value further comprises:
   generating a horizontal partial sum Xp(L) for gates having edges L=L$_1$, ... L$_n$ of the object within the gate for the I(i,j) pixels above a predetermined threshold according to the following relationship $$Xp(L) = \sum_{j=\text{Max}j}^{L} X(j)$$

generating a vertical partial sum Xp(L) of the object within the gate for the I(i,j) pixels above a predetermined threshold according to the following relationship $$Yp(L) = \sum_{j=\text{Max}j}^{L} Y(j)$$

generating a normalization value Ip(L) of the object within the gate for the I(i,j) pixels above a predetermined threshold according to the following relationship $$Ip(L) = \sum_{j=\text{Max}j}^{L} I(j)$$

14. The method as defined in claim 13 further comprising the step of generating a horizontal position Xc(L) of the centroid for the portion of the object appearing within the gate according to the following relationship $$Xc(L) = \frac{Xp(L)}{Ip(L)}$$

15. The method as defined in claim 14 wherein the gate includes a left edge having a horizontal position L and the edge of the object E has a horizontal position E, and the horizontal position of the centroid Xc is defined in accordance with the following relationship $$Xc = \frac{E}{n} + \left(1 - \frac{1}{n}\right) \times L$$

where $2 \leq n \leq 3$.

16. The method as defined in claim 15 wherein Xc defines a line having an intercept Xo and slope m and the horizontal position E of the edge of the object, and further comprising the step of is defining the following relationships to determine E.

$$n = \frac{1}{1-m}, \text{ and}$$

$$E = X_0 \times n.$$

17. An airborne object tracking and defeat system comprising:
   a sensor for capturing an image of the object;
   a track processor for receiving the image captured by the sensor and for locating a leading edge of the object appearing in the image within a single video frame of data, where the video frame has pixels arranged generally vertically and horizontally, and where the object is defined within the video frame in accordance with the intensity of the pixels;
   an edge detector within the track processor for examining the intensity of the pixels from the memory and for determining the leading edge of the object within the video frame, the edge detector performing the steps of:
(a) defining a gate having a position within the video frame,
(b) calculating partial sums and a normalization value in accordance with the intensity of the pixels and in accordance with the position of the pixels,
(c) determining a centroid of a portion of the object within the gate in accordance with the partial sums and the normalization value, the centroid having a position defined by a line having a slope,
(d) testing if the centroid falls within a preselected section of the gate, and moving an edge of the gate to define a new gate if the centroid does not fall within the preselected section of the gate, and redetermining the centroid for the portion of the object appearing within the new gate, and
(e) determining the leading edge of the object in accordance with the position of the gate, the position of the centroid, and the slope;

an aim controller receiving the position of the leading edge of the object from the track processor and generating output commands based on the position of the leading edge of the object; and a positional gimble receiving the output commands and translating in response thereto.

* * * * *